US011628868B2

(12) United States Patent
Okada et al.

(10) Patent No.: US 11,628,868 B2
(45) Date of Patent: Apr. 18, 2023

(54) CAR CONTROL DEVICE AND CAR CONTROL SYSTEM

(71) Applicant: Mitsubishi Electric Corporation, Tokyo (JP)

(72) Inventors: Yuruki Okada, Tokyo (JP); Yoshinori Yamashita, Tokyo (JP); Kota Teramoto, Tokyo (JP); Yoshinori Chiba, Tokyo (JP); Sho Kato, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 352 days.

(21) Appl. No.: 16/307,357

(22) PCT Filed: Jun. 16, 2016

(86) PCT No.: PCT/JP2016/067984
§ 371 (c)(1),
(2) Date: Dec. 5, 2018

(87) PCT Pub. No.: WO2017/216931
PCT Pub. Date: Dec. 21, 2017

(65) Prior Publication Data
US 2019/0300028 A1 Oct. 3, 2019

(51) Int. Cl.
B61L 3/00 (2006.01)
B61C 17/12 (2006.01)
(Continued)

(52) U.S. Cl.
CPC ............ *B61L 3/006* (2013.01); *B60K 23/08* (2013.01); *B60L 9/18* (2013.01); *B60L 15/2045* (2013.01);
(Continued)

(58) Field of Classification Search
None
See application file for complete search history.

(56) References Cited

U.S. PATENT DOCUMENTS 7,958,960 B2    6/2011  Mizutani et al.
9,610,948 B2 *  4/2017  Kumar ............ B60W 30/18027
2005/0029024 A1 2/2005  Takami et al.
(Continued)

FOREIGN PATENT DOCUMENTS

AU   2013205978 A1   12/2013
JP   07-308004 A     11/1995
(Continued)

OTHER PUBLICATIONS

Extended European Search Report dated May 28, 2019, issued by the European Patent Office in corresponding European Application No. 16905486.3. (10 pages).
(Continued)

Primary Examiner — Lail A Kleinman
(74) Attorney, Agent, or Firm — Buchanan Ingersoll & Rooney PC

(57) ABSTRACT

A car control device includes a driving force calculating unit that calculates driving force necessary for a train to travel; an operating number calculating unit that determines the number of M cars to be operated on the basis of the driving force; and a driving force command calculating unit that calculates driving force commands to be given to the M cars that operate depending on the number of M cars to be operated, wherein the driving force command calculating unit continuously changes the driving force commands when the number of M cars to be operated changes.

10 Claims, 9 Drawing Sheets

(51) Int. Cl.
  *B60L 15/20* (2006.01)
  *B60K 23/08* (2006.01)
  *B60L 9/18* (2006.01)
  *B60W 30/02* (2012.01)

(52) U.S. Cl.
  CPC ............. *B60W 30/02* (2013.01); *B61C 17/12* (2013.01); *B60L 2200/26* (2013.01); *B60L 2260/26* (2013.01)

(56) References Cited

U.S. PATENT DOCUMENTS

| | | | |
|---|---|---|---|
| 2005/0189887 A1* | 9/2005 | Donnelly | B61C 15/14 318/52 |
| 2007/0173990 A1* | 7/2007 | Smith | B61L 3/127 701/20 |
| 2010/0004090 A1 | 1/2010 | Mizutani et al. | |
| 2013/0035811 A1 | 2/2013 | Schroeck et al. | |
| 2014/0277860 A1 | 9/2014 | Pulliam et al. | |
| 2014/0350815 A1* | 11/2014 | Kambe | B60W 30/0956 701/70 |
| 2014/0365098 A1 | 12/2014 | Lawry et al. | |
| 2015/0013312 A1* | 1/2015 | Gallagher | F02M 25/0818 60/274 |
| 2015/0014081 A1 | 1/2015 | Noguchi | |
| 2016/0090107 A1* | 3/2016 | Deshpande | B60R 25/045 701/82 |
| 2017/0232943 A1* | 8/2017 | Brooks | B60T 7/128 701/19 |

FOREIGN PATENT DOCUMENTS

| | | |
|---|---|---|
| JP | 2003-219504 A | 7/2003 |
| JP | 2005-006369 A | 1/2005 |
| JP | 2005-020859 A | 1/2005 |
| KR | 10-2008-0075894 A | 8/2008 |

OTHER PUBLICATIONS

International Search Report (PCT/ISA/210) dated Aug. 9, 2016, by the Japan Patent Office as the International Searching Authority for International Application No. PCT/JP2016/067984.
Written Opinion (PCT/ISA/237) dated Aug. 9, 2016, by the Japan Patent Office as the International Searching Authority for International Application No. PCT/JP2016/067984.
Office Action dated Jun. 15, 2021, by the India Patent Office in corresponding India Patent Application No. 201847044665 and English translation of the Office Action (6 pages).
Summons to Attend Oral Proceedings issued in corresponding European Patent Application No. 16905486.3-1012, dated Apr. 7, 2022 (6 pages).
Office Action (Communication pursuant to Article 94(3) EPC) dated Nov. 25, 2020, by the European Patent Office in corresponding European Patent Application No. 16905486.3. (6 pages).

* cited by examiner

CAR CONTROL DEVICE AND CAR CONTROL SYSTEM

FIELD

The present invention relates to a car control device and a car control system for controlling a train including a plurality of motors.

BACKGROUND

In a case where a plurality of motor cars (hereinafter referred to as "M cars") equipped with motors are present, load is typically shared equally by the M cars even under a condition other than a maximum load. In addition, in view of torque-efficiency characteristics, the efficiency of a motor has such characteristics that the overall efficiency is higher as the load applied on the motor is higher and, conversely, the overall efficiency is significantly lowered as the load is lower (see FIG. 2 in Patent Literature 1 below, for example).

Thus, if the load is low, the efficiency will be significantly lowered when the load is equally shared by the M cars. For this reason, in Patent Literature 1, M car selection control of determining the number of M cars to be operated and the power output of each motor depending on required torque, and unloading M cars that are not to be operated.

CITATION LIST

Patent Literature

Patent Literature 1: Japanese Patent Application Laid-open No. H07-308004

SUMMARY

Technical Problem

Patent Literature 1 discloses a method of selecting M cars but does not disclose any switching method for switching between an M car selection mode and a normal mode. Furthermore, Patent Literature 1 provides a configuration in which the output torque of each motor fluctuates greatly when the number of unloaded M cars has changed in the M car selection mode (see FIG. 4 in the citation). This may cause deterioration in riding comfort when the number of M cars has changed.

The present invention has been made in view of the above, and an object thereof is to provide a car control device and a car control system enabling prevention of deterioration in riding comfort even when the number of M cars to be operated is changed.

Solution to Problem

A car control device according to an aspect of the present invention includes: a driving force calculating unit that calculates driving force necessary for a train to travel; an operating number calculating unit that determines the number of M cars to be operated on the basis of the driving force; and a driving force command calculating unit that calculates driving force commands to be given to the M cars that operate depending on the number of M cars to be operated, wherein the driving force command calculating unit continuously changes the driving force commands when the number of M cars to be operated changes.

Advantageous Effects of Invention

According to the present invention, an advantageous effect of preventing deterioration in riding comfort even when the number of M cars to be operated is changed is produced.

DESCRIPTION OF EMBODIMENTS

Figure 1:
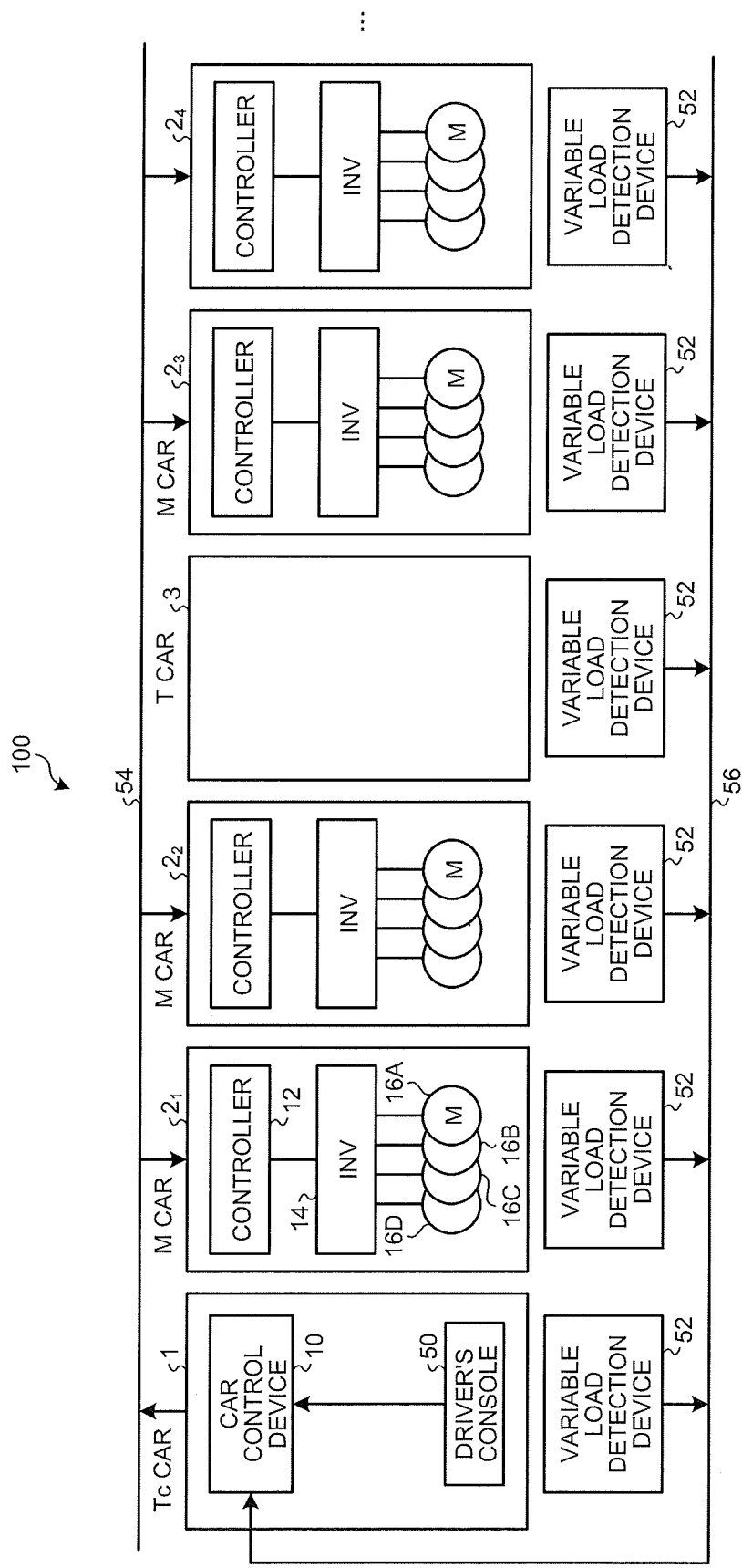
FIG. 1 is a block diagram illustrating an example configuration of a car control device according to a first embodiment.

A car control device and a car control system according to embodiments of the present invention will be described below with reference to the drawings. Note that the present invention is not limited to the embodiments below. In the description below, each of components will be represented by a reference numeral with a subscript when individual components are to be identified, but the subscripts will be omitted when individual components are not to be identified.

First Embodiment

Figure 2:
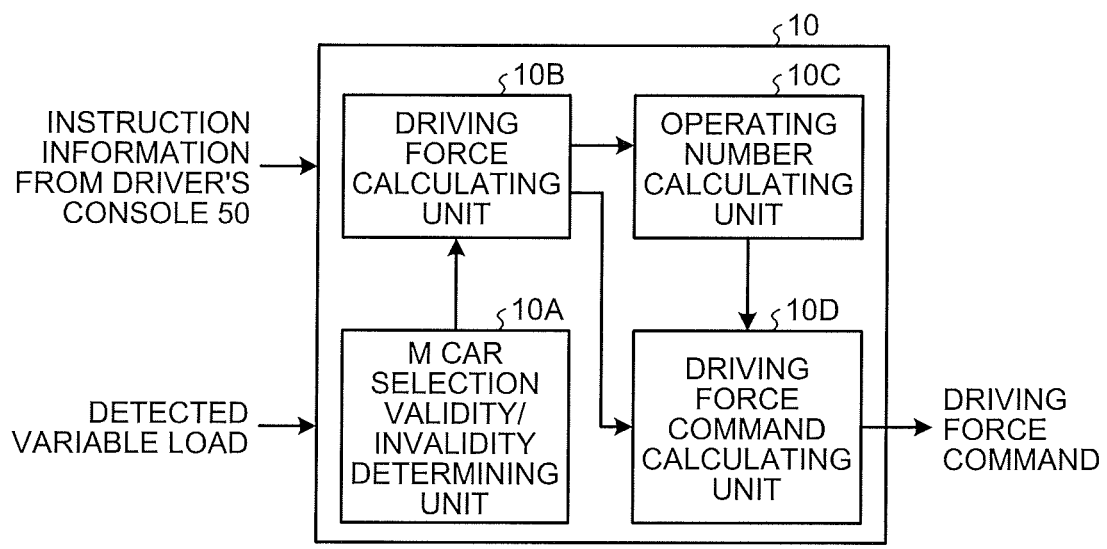
FIG. 2 is a block diagram illustrating a detailed configuration of the car control device according to the first embodiment.

FIG. 1 is an entire system configuration diagram including a car control device according to a first embodiment. FIG. 2 is a block diagram illustrating a detailed configuration of the car control device according to the first embodiment.

FIG. 1 illustrates a train 100 including a control car (hereinafter referred to as a "Tc car") 1 equipped with no motor but with a driver's console 50, four M cars $2_1$ to $2_4$ equipped with motors, and a trailer car (hereinafter referred to as a "T car") 3 with no motor.

The Tc car 1 is equipped with a car control device 10 in addition to the driver's console 50. The M car $2_1$ is equipped with four motors 16A to 16D that apply driving force to the train 100, an inverter 14 that drives the four motors 16A to 16D overall, and a controller 12 that controls power conversion operation of the inverter 14. The other M cars $2_2$ to $2_4$ have similar configurations. In addition, the Tc car 1, the M cars $2_2$ to $2_4$, and the T car 3 each include a variable load detection device 52 that detects variable load on the corresponding car. A detected variable load detected by the variable load detection device 52 is transmitted to the car control device 10 via a transmission line 56. While four M cars $2_2$ to $2_4$ are illustrated as the M cars constituting the train 100 in FIG. 1, the number of M cars may be any number as long as the number is two or more. In addition, while four motors 16A to 16D are illustrated in each of the M cars 2, each of the M cars 2 may include at least one motor.

As illustrated in FIG. 2, the car control device 10 includes an M car selection validity/invalidity determining unit 10A that is a determination unit for determining whether or not to perform control of selecting some M cars from the M cars constituting the train, a driving force calculating unit 10B that calculates the driving force necessary for the train to travel, an operating number calculating unit 100 that determines the number of M cars to be operated on the basis of the driving force necessary for the train to travel, and a driving force command calculating unit 10D that calculates a driving force command to be given to M cars to be operated on the basis of the number of M cars to be operated. The driving force command calculated by the driving force command calculating unit 10D is transmitted to the controllers 12 of the M cars 2 equipped with the motors 16 via the transmission line 54.

Figure 3:
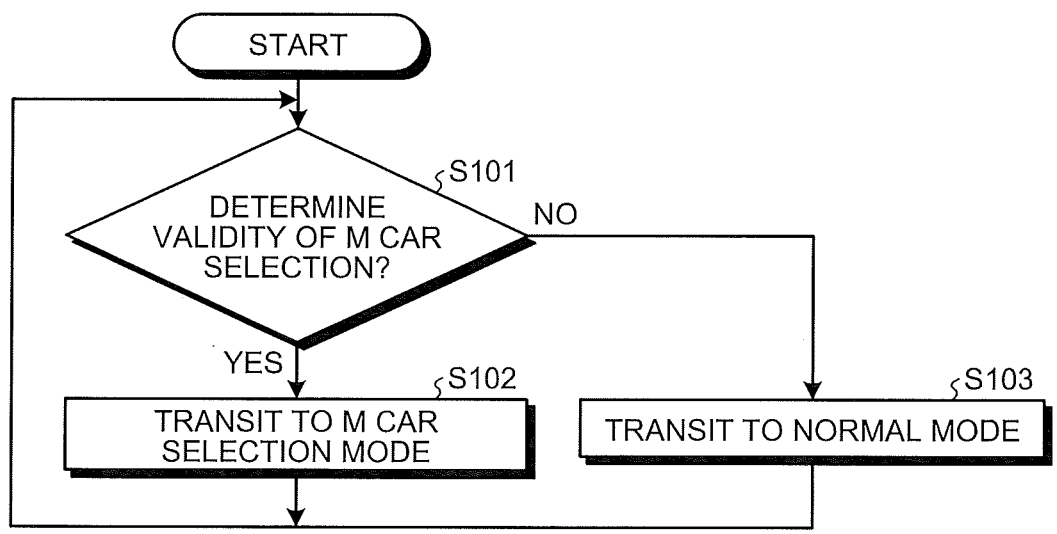
FIG. 3 is a flowchart relating to switching of operation modes in the car control device according to the first embodiment.

Next, operation of the car control device according to the first embodiment will be described. FIG. 3 is a flowchart relating to switching of operation modes.

The process flow illustrated in FIG. 3 is performed by the M car selection validity/invalidity determining unit 10A illustrated in FIG. 2. First, in step S101, the M car selection validity/invalidity determining unit 10A determines whether M car selection control is to be valid or invalid on the basis of information from the driver's console 50. If the M car selection control is determined to be valid (step S101: Yes), the operation transits to an M car selection mode (step S102). On the other hand, if the M car selection control is determined to be invalid (step S101: No), the operation transits to a normal mode (step S103). The M car selection mode and the normal mode will be described later.

Figure 4:
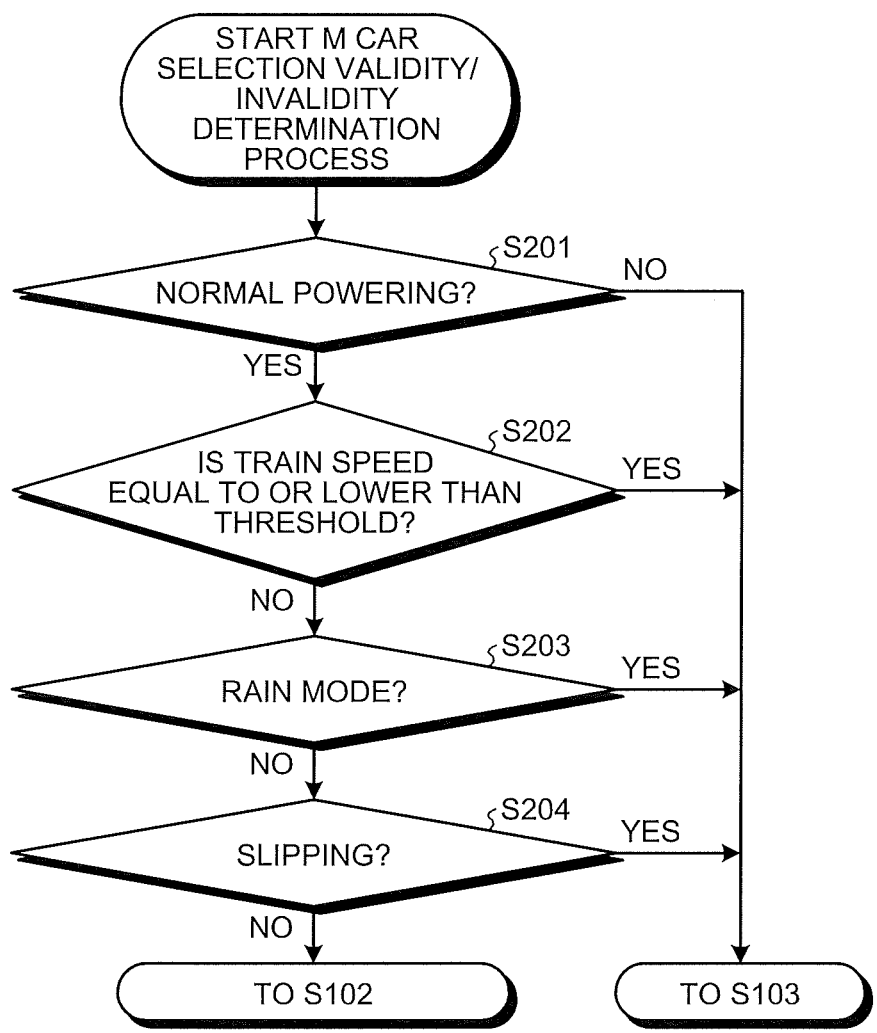
FIG. 4 is a flowchart relating to an M car selection validity/invalidity determination process in the car control device according to the first embodiment.

FIG. 4 is a flowchart relating to an M car selection validity/invalidity determination process. The process flow illustrated in FIG. 4 is also performed by the M car selection validity/invalidity determining unit 10A. First, in step S201, the M car selection validity/invalidity determining unit 10A determines whether or not the instruction from the driver's console 50 to the car control device 10 is normal powering. Note that normal powering is a term defined with intent to be distinguished from powering during M car selection control (hereinafter referred to as "M car selection powering"), which will be described later. If the instruction to the car control device 10 is not normal powering (step S201: No), the process proceeds to step S103 illustrated in FIG. 3. If the instruction to the car control device 10 is normal powering (step S201: Yes), the process proceeds to step S202.

In step S202, the M car selection validity/invalidity determining unit 10A determines whether or not the train speed is equal to or lower than a threshold. If the train speed is equal to or lower than the threshold (step S202: Yes), the process proceeds to step S103 illustrated in FIG. 3. On the other hand, if the train speed is higher than the threshold (step S202: No), the process proceeds to step S203. Note that the reason for which the determination process of step S202 is provided is to apply the M car selection control when the train is traveling at a speed higher than a certain speed. Within a low speed range, because power consumed by motors is low, the effect of M car selection control is small. For achieving an energy saving effect while preventing deterioration in riding comfort, the M car selection control in a high speed range is effective.

In subsequent step S203, the M car selection validity/invalidity determining unit 10A checks whether or not the operation mode of the train is a rain mode. If the operation mode is the rain mode (step S203: Yes), the process proceeds to step S103 illustrated in FIG. 3. On the other hand, if the operation mode is not the rain mode (step S203: No), the process proceeds to step S204. Note that the rain mode is a mode for changing or distinguishing some operation of a control system between a case of rain and cases other than rain. When it rains, the adhesive force of wheels lowers and slide becomes likely to occur, which may make it difficult to perform control to prevent deterioration in riding comfort. The determination process of step S203 is thus provided to avoid transition to the M car selection mode in the rain mode. In addition, transition to the rain mode is exemplary set by manual operation of the driver or automatically set in response to wiper operation. In a case where no rain mode is provided, the determination may be made on the basis of a wiper operation signal or a rain mode may be built for the control according to the present embodiment.

In subsequent step S204, the M car selection validity/invalidity determining unit 10A determines whether or not wheels of M cars 2 that drive the train, that is, driving wheels are slipping. If at least one of the driving wheels is slipping (step S204: Yes), the process proceeds to step S103 illustrated in FIG. 3. On the other hand, if no driving wheels are slipping (step S204: No), the process proceeds to step S102 illustrated in FIG. 3. Because it is difficult to perform control to prevent deterioration in riding comfort in the case of slipping, the determination process of step S204 is provided to avoid transition to the M car selection mode during slipping.

Next, supplementary description on the determination process of step S201 and the determination process of step S204 above will be provided. First, in the determination process of step S201, it is determined whether or not the instruction from the driver's console 50 is normal powering. During transition from a coasting state or a stop state to powering operation, however, an oscillation phenomenon in which adjacent cars push each other and are pushed by each other is likely to occur owing to the influence of play of a coupler between the cars. Thus, the normal mode is preferable at a start of powering when emphasis is placed on riding comfort. For this reason, for transition from a stop state to normal powering and for transition from a coasting state to normal powering, it is preferable to set a time element until transition and perform the transition to the determination process of step S202 after the time element has elapsed instead of immediate transition to step S202.

In the determination process of step S204, if no driving wheels are slipping, transition to the process of step S102, that is, to the M car selection mode is made. If, however, it is determined that slipping is occurring in the immediately preceding determination process, the determination on slipping may not be stable but may fluctuate. Thus, when it is determined that slipping is occurring, it is preferable to set a time element until transition to step S102 and perform the transition to step S102 after the time element has elapsed instead of immediate transition to step S102. An example of specific techniques is providing a slip flag in the M car selection validity/invalidity determining unit 10A or in the car control device 1 and, when the slip flag is set, clearing the slip flag after elapse of the time element.

Figure 5:
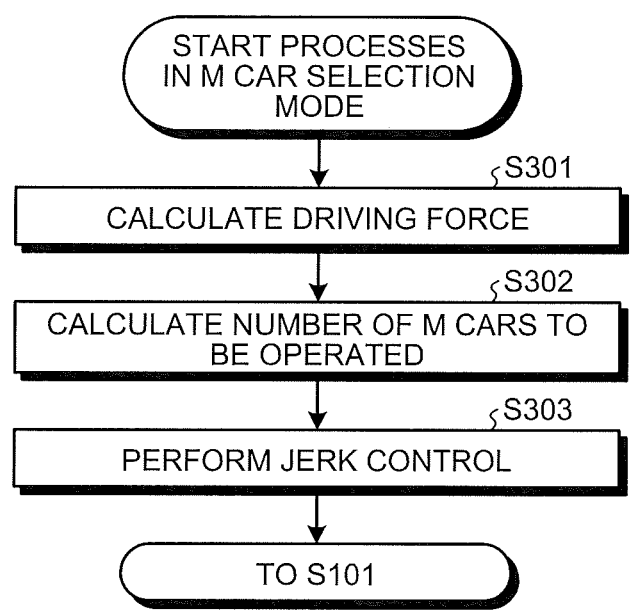
FIG. 5 is a flowchart relating to processes in an M car selection mode in the car control device according to the first embodiment.

FIG. 5 is a flowchart relating to processes in the M car selection mode. The process flow illustrated in FIG. 5 includes three processes from step S301 to step S303. First, the process of step S301 is performed by the driving force calculating unit 10B. In step S301, the driving force calculating unit 10B calculates driving force of the whole train. The driving force of the whole train can be calculated by multiplying variable loads of all the cars detected by the variable load detection devices 52 by an acceleration corresponding to a powering command instructed from the driver's console 50.

The process in subsequent step S302 is performed by the operating number calculating unit 10C. In step S302, the operating number calculating unit 10C determines the number of M cars to be operated on the basis of the driving force calculated in step S301. Specifically, the number of M cars to be operated can be calculated by dividing the driving force W calculated in step S301 by a maximum power output P of one M car and rounding up the quotient to an integer.

The process in subsequent step S303 is performed by the driving force command calculating unit 10D. In step S303, the driving force command calculating unit 10D calculates a driving force command to be given to the controllers of the M cars 2 on the basis of the driving force obtained in step S301 and the number of M cars to be operated obtained in step S302. The driving force command calculating unit 10D performs jerk control in calculation of the driving force command. Details of the jerk control will be described with reference to FIG. 6.

Figure 6:
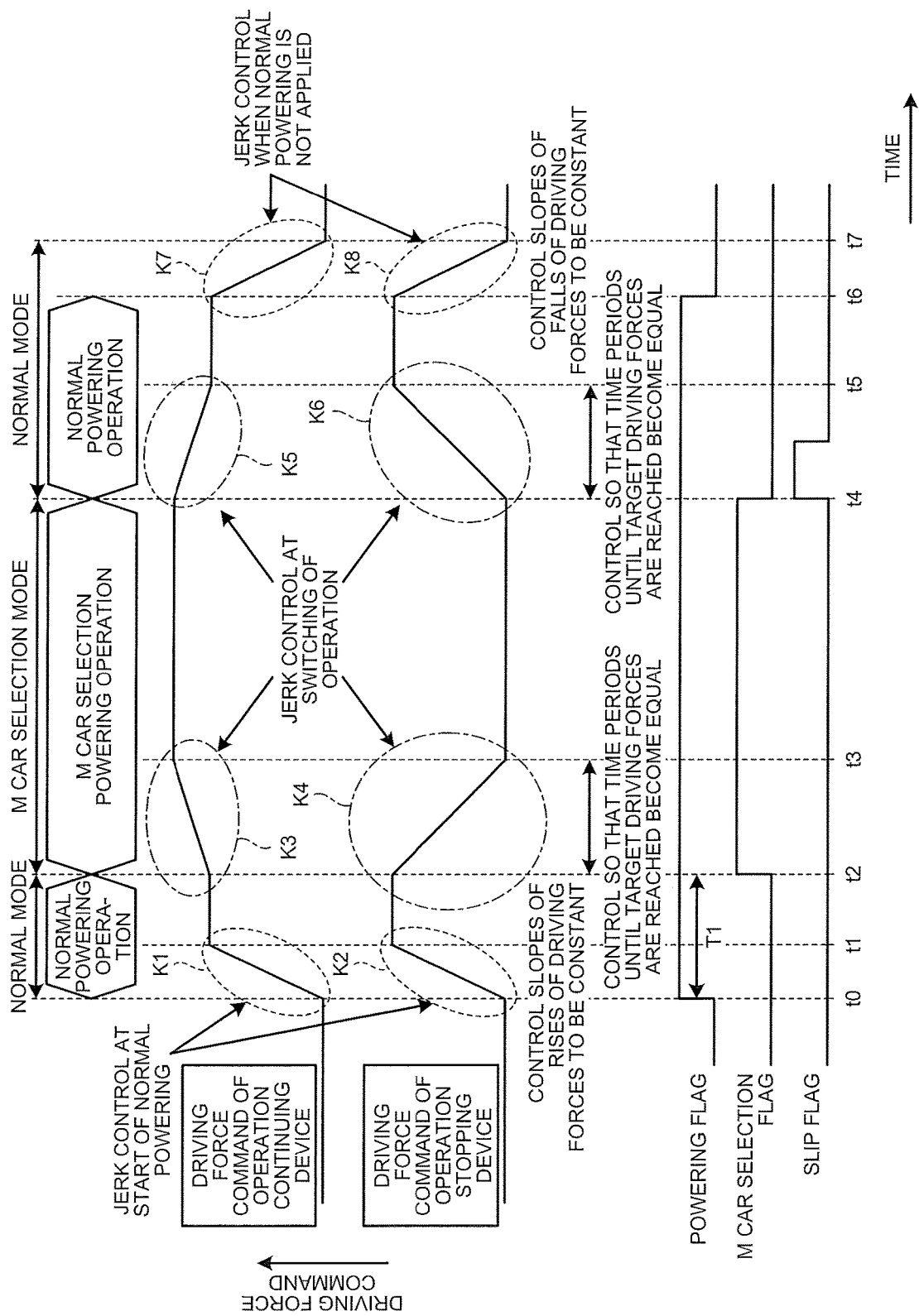
FIG. 6 is a timing diagram for description of jerk control in first and second embodiments.

FIG. 6 is a timing diagram for description of the jerk control in the present embodiment. In FIG. 6, the horizontal axis represents time, and the vertical axis represents the driving force command. In addition, in FIG. 6, an upper waveform is a waveform of a driving force command of operation continuing device, and a lower waveform is a waveform of a driving force command of operation stopping device. The "driving force command of operation continuing device" refers to a driving force command for the whole M cars specified to be operated in M car selection powering, and the "driving force command of operation stopping device" refers to a driving force command for the whole M cars specified not to be operate in the M car selection powering.

In addition, in a lower part of FIG. 6, a powering flag, an M car selection flag, and a slip flag are illustrated. The powering flag is a flag that is set when a powering command is output from the driver's console 50, the M car selection flag is a flag that is set at transition to the M car selection mode, and the slip flag is a flag that is set when at least one of the driving wheels is determined to be slipping. Note that, in the description below, setting of a flag will be referred to as "on" and clearing of a flag will be referred to as "off."

In FIG. 6, at time t0, the powering flag becomes on, and normal powering operation in a normal powering mode is started. In the normal powering operation, both of the driving force command of operation continuing device and the driving force command of operation stopping device rise with slopes controlled to be constant and settle at specified driving force commands at time t1 as illustrated in broken-line ellipses K1 and K2. Note that control for the parts illustrated in the broken-line ellipses K1 and K2 is referred to as jerk control at the start of normal powering in the present embodiment.

At time t2, the M car selection flag becomes on. Note that a time difference T1 between time t2 and time t0 is a time difference corresponding to the time element in the determination process of step S202 described above. At time t2, the operation transits to the M car selection mode, and M-car-selection-powering-operation is performed from time t2 to time t4. In the M-car-selection-powering-operation, the driving force command of operation stopping device falls toward zero as illustrated in a dashed-dotted-line ellipse K4. In the meantime, the driving force command of operation continuing device rises toward the driving force command calculated by the driving force calculating unit 10B as illustrated in a dashed-dotted-line ellipse K3.

Four characteristic features of the control described above are as follows. A first feature is that a transition period is provided for each of the driving force commands given to the M cars. A second feature is that, in the transition periods, a period during which the driving force command of operation continuing device and a period during which the driving force command of operation stopping device changes are coincident with each other in a period from t2 to t3. Thus, in the period from time t2 to time t3, control is performed so that the time periods until target driving force commands are reached become equal to each other. A third feature is that the values of the driving force commands do not change in a stepped manner but change continuously from time t2 to time t3 during which the number of M cars to be operated changes. A fourth feature is that a sum of the driving force command of operation continuing device and the driving force command of operation stopping device is kept at a constant value during the process in which both of the driving force command of operation continuing device and the driving force command of operation stopping device change. From time t3 to time t4, the driving forces are maintained to be constant.

At time t4, the slip flag becomes on in response to detection of slipping. As a result of the slip flag becoming on, the M car selection flag becomes off, and the operation mode is switched from the M car selection mode to the normal mode. Thus, at time t4, the operation is switched to the normal powering operation in accordance with the normal powering mode. From time t4 to time t5, the driving force command of operation continuing device falls to the driving force command before switching to the M car selection mode, that is, the driving force command specified from time t1 to time t2 in the present example as illustrated in a dashed-dotted-line ellipse K5. In the meantime, the driving force command of operation stopping device rises to the driving force command before switching to the M car selection mode, that is, the driving force command specified from time t1 to time t2 in the present example as illustrated in a dashed-dotted-line ellipse K6. Note that the control of the parts illustrated in the dashed-dotted-line ellipses K3 to K6 is referred to as jerk control at switching of operation in the present embodiment.

Four characteristic features of the control described above are as follows. A first feature is that, in the transition periods, a transition period is provided for each of the driving force commands given to the M cars. A second feature is that a period during which the driving force command of operation continuing device changes and a period during which the driving force command of operation stopping device changes are coincident with each other in a period from t4 to t5. Thus, in the period from time t4 to time t5, control is performed so that the time periods until the specified driving force commands are reached become equal to each other. A third feature is that the values of the driving force commands do not change in a stepped manner but change continuously from time t4 to time t5 during which the number of M cars to be operated changes. A fourth feature is that a sum of the driving force command of operation continuing device and the driving force command of operation stopping device is kept at a constant value during the process in which both of the driving force command of operation continuing device and the driving force command of operation stopping device change. From time t5 to time t6, the driving force commands are maintained to be constant.

At time t6, the powering flag becomes off, and both the driving force command of operation continuing device and the driving force command of operation stopping device fall toward zero. In this process, both the driving force command of operation continuing device and the driving force command of operation stopping device fall with slopes controlled to be constant and settle at zero at time t7 as illustrated in broken-line ellipses K7 and K8. Note that the control of the parts illustrated in the broken-line ellipses K7 and K8 is referred to as jerk control when the normal powering is not applied in the present embodiment.

The description refers back to FIG. 5. After the process of step S303 is performed, the process returns to the process of step S101 illustrated in FIG. 3 and the M car selection validity/invalidity determination process is continued. Note that the driving force command calculated by the car control device 10 is transmitted to the controllers 12 of the M cars 2 via the transmission line 54. Each of the controllers 12 in the M cars 2 generates torque commands to be given to the motors 16 on the basis of the driving force command, and controls the inverter 14 to drive the four motors 16A to 16D. Note that one to three motors that are selected may be driven instead of all of the four motors 16A to 16D as long as the driving force as instructed by the car control device 10 is maintained.

According to the car control device according to the first embodiment described above, the driving force necessary for the train to travel is calculated, the number of M cars to be operated is determined on the basis of the calculated driving force, the driving force commands to be given to the M cars to be operated are calculated depending on the determined number of M cars to be operated, and the driving force commands are continuously changed when the number of M cars to be operated changes. The car control device enables prevention of deterioration in riding comfort even when the number of M cars to be operated has changed.

In addition, when the driving force commands are continuously changed, the driving force commands are changed in such a manner that the period during which the driving force command for operation continuing motor cars changes and the period during which the driving force command for operation stopped motor cars are coincident with each other. The car control device enables prevention of deterioration in riding comfort even when the number of M cars to be operated has changed.

Furthermore, when the driving force commands are continuously changed, the sum of the driving force command for operation continuing motor cars and the driving force command for operation stopped motor cars is kept at a constant value during the process in which both of the driving force commands change. The car control device enables prevention of deterioration in riding comfort even when the number of M cars to be operated has changed.

Note that, in the car control device according to the first embodiment, it may be configured such that determination on the train speed based on a threshold is performed and M car selection control to reduce the number of M cars to be operated is performed when the train speed exceeds the threshold. Because power consumed by motors is also high when the train speed is high, an energy saving effect is achieved by performing the M car selection control.

In addition, in the car control device according to the first embodiment, when it rains or in a rain mode, the M car selection control may be canceled. Cancelation of the M car selection control achieves ease of control for preventing deterioration in riding comfort.

In addition, in the car control device according to the first embodiment, when a driving wheel of the train is slipping, the M car selection control may be canceled. Cancelation of the M car selection control achieves ease of control for preventing deterioration in riding comfort.

Second Embodiment

Figure 7:
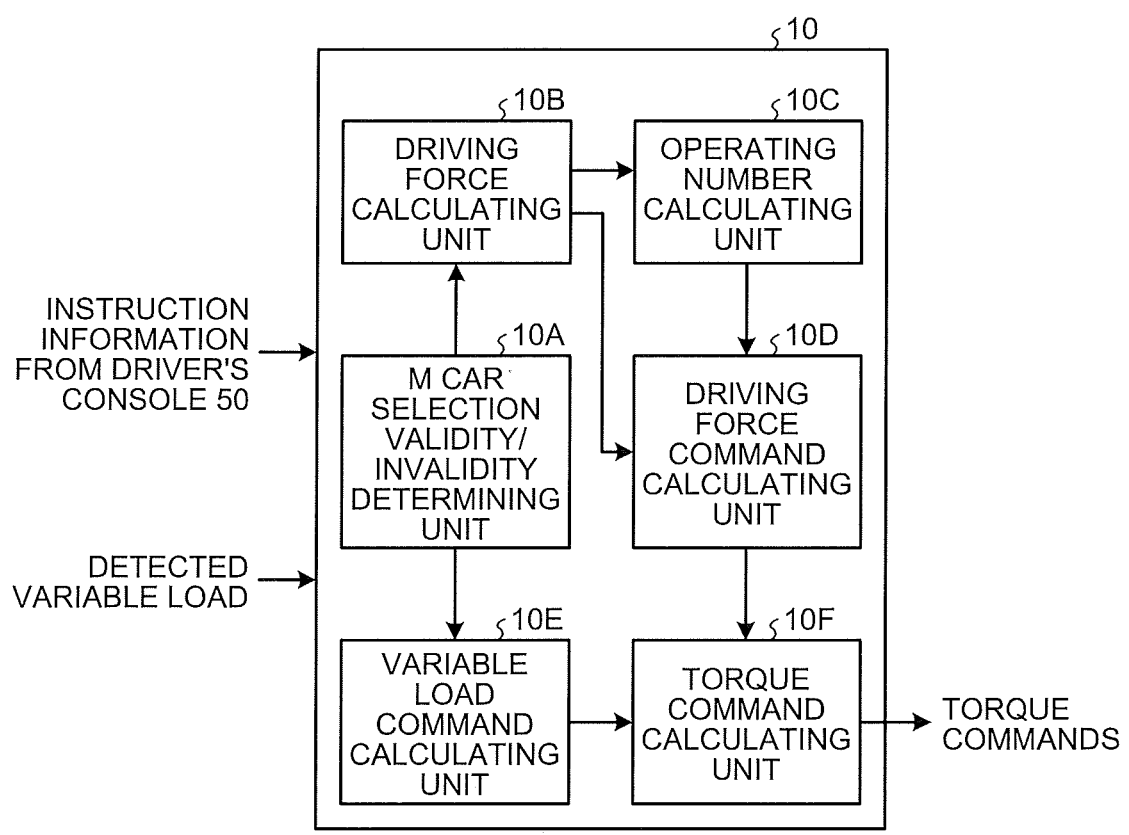
FIG. 7 is a block diagram illustrating a detailed configuration of a car control device according to the second embodiment.
Figure 8:
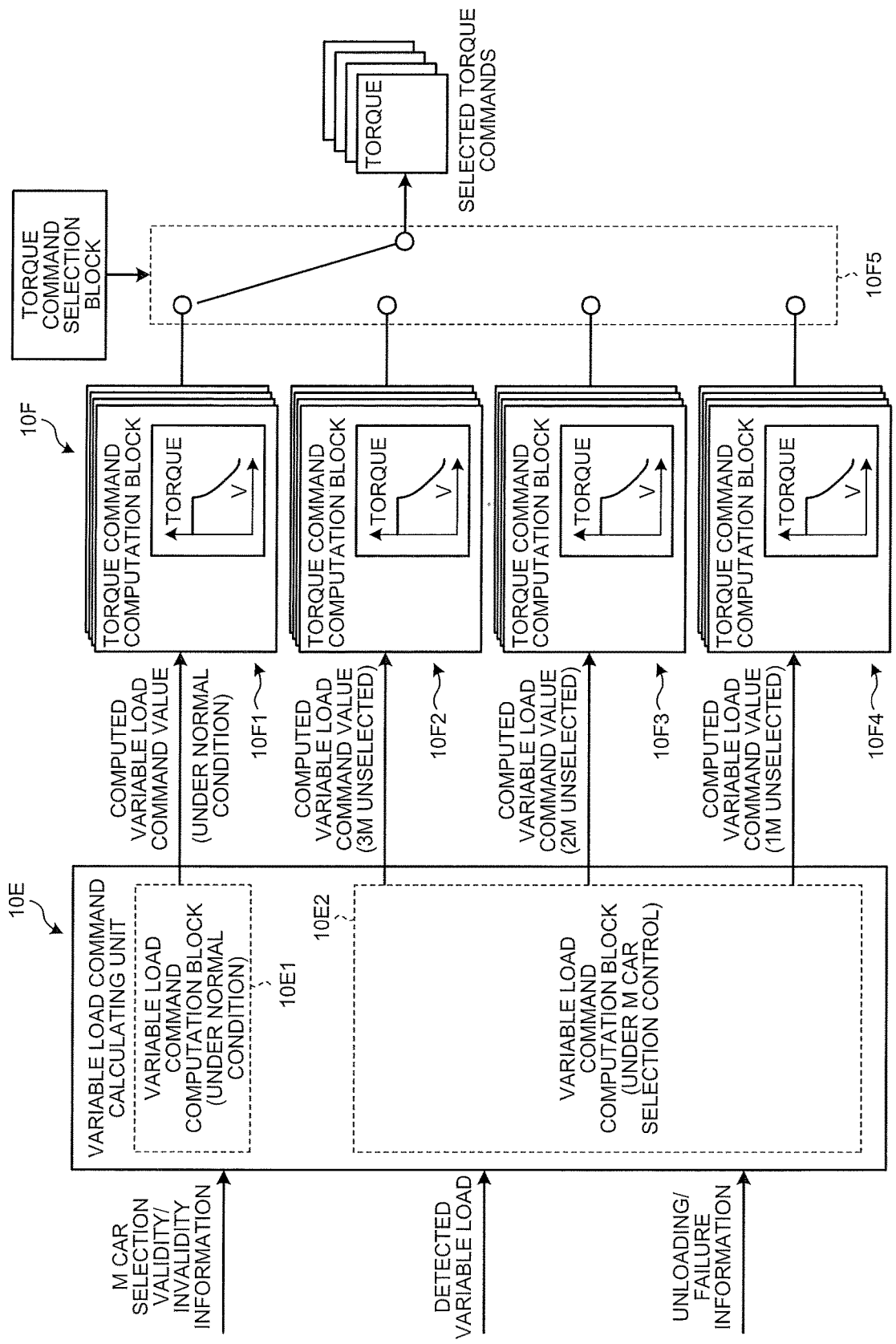
FIG. 8 is an explanatory diagram illustrating a concept of torque command generation in the car control device of the second embodiment.

In the first embodiment, the driving force commands generated by the car control device 10 are output to the controllers 12 of the M cars 2, and torque commands are generated at the controllers 12. In contrast, in a second embodiment, the car control device 10 correctively generates torque commands, and gives the generated torque commands to the controllers 12 of the M cars 2. Hereinafter, the car control device according to the second embodiment will be described with reference to FIGS. 7 and 8. FIG. 7 is a block diagram illustrating a detailed configuration of the car control device according to the second embodiment. FIG. 8 is an explanatory diagram illustrating a concept of torque command generation in the car control device of the second embodiment. Note that the entire system configuration including the car control device according to the second embodiment is the same as or similar to the configuration in FIG. 1.

As illustrated in FIG. 7, the car control device 10 according to the second embodiment includes a variable load command calculating unit 10E and a torque command calculating unit 10F as components in addition to the configuration of FIG. 2. In order to prevent an oscillation phenomenon in which adjacent cars push each other and are pushed by each other, acceleration forces at the M cars need to be equal. On the other hand, in order to make the acceleration forces equal, a value of variable load, which varies depending on the number of passengers, is needed. The variable load command calculating unit 10E is thus provided.

The variable load command calculating unit 10E calculates a variable load command for each of the M cars 2 on the basis of a detected variable load detected by the variable load detection device 52 and M car selection information from the M car selection validity/invalidity determining unit 10A, and outputs the calculated variable load commands, that is, computed variable load command values to the torque command calculating unit 10F. The torque command calculating unit 10F calculates torque commands in a plurality of patterns including both of normal powering and M car selection powering on the basis of the computed variable load command values calculated by the variable load command calculating unit 10E. Note that, in the process performed by the variable load command calculating unit 10E, information on validity/invalidity of M car selection is not necessary if the computed variable load command values are calculated regardless of content of the information on validity/invalidity of M car selection.

FIG. 8 illustrates the configurations of the variable load command calculating unit 10E and the torque command calculating unit 10F illustrated in FIG. 7 in more detail. Note that FIG. 8 illustrates an exampler case where the number of M cars included in the train is four. In FIG. 8, "under normal condition" in brackets indicates a flow of processes in a case where M car selection is not performed. In addition, "under M car selection control" in brackets indicates a flow of processes in a case where M car selection is performed. Furthermore, "3M unselected" in brackets "under M car selection control" indicates a flow of processes in a case where three out of the four M cars are unselected, that is, one M car is selected. Similarly, "2M unselected" indicates a flow of processes in a case where two out of the four M cars are unselected (two M cars are selected), and "1M unselected" indicates a flow of processes in a case where one out of the four M cars is unselected (three M cars are selected).

In FIG. 8, the variable load command calculating unit 10E includes a variable load command computation block 10E1 that computes a variable load command under normal condition, and a variable load command computation block 10E2 that computes a variable load command under M car selection control. In addition, the torque command calculating unit 10F includes four torque command computation blocks 10F1 to 10F4 associated with the four patterns of possible variations with the number of M cars being four, which are normal condition (that is, 0 unselected), 3M unselected, 2M unselected, and 1M unselected, and a torque command selection block 10F5 that selects an output from any one of the four torque command computation blocks 10F1 to 10F4. Note that M car selection validity/invalidity information, a detected variable load, and unloading/failure information (these pieces of information and the value are hereinafter referred to as "input information") are input to the variable load command calculating unit 10E. Note that the unloading/failure information is information on a motor that cannot be driven owing to unloading, failure, or the like.

The variable load command computation block 10E1 under normal condition calculates a computed variable load command value under normal condition on the basis of the input information, and outputs the computed variable load command value to the torque command computation block 10F1. Furthermore, the variable load command computation block 10E2 calculates a computed variable load command value under 3M unselected on the basis of the input information, and outputs the computed variable load command value to the torque command computation block 10F2. Similarly, the variable load command computation block 10E2 calculates a computed variable load command value under 2M unselected on the basis of the input information, outputs the computed variable load command value to the torque command computation block 10F3, also calculates a computed variable load command value under 1M unselected on the basis of the input information and outputs the computed variable load command value to the torque command computation block 10F4.

With the four torque command computation blocks 10F1 to 10F4, all the torque patterns for the M cars corresponding to the number of unselected M cars are generated. Herein, the case of 2M unselected will be described as an example.

In the case of 2M unselected, two out of four M cars $2_1$ to $2_4$ are selected; accordingly, there are six combinations of the selected two M cars, which are $(2_1, 2_2)$, $(2_1, 2_3)$, $(2_1, 2_4)$, $(2_2, 2_3)$, $(2_2, 2_4)$, and $(2_3, 2_4)$. The torque command computation block 10F3 thus calculates in advance torque patterns for these six combinations. Note that, because the number of passengers changes at each stop at a station, the torque command computation block 10F3 updates the torque pattern at each stop.

The explanation in the case of 2M unselected is as described above; torque patterns are generated in a similar manner in the cases of 1M unselected and 3M unselected. The torque command selection block 10F5 selects torque commands with the largest number of unselected M cars from those satisfying necessary torque commands, and outputs the selected torque commands to the controllers 12.

The selection process performed by the torque command selection block 10F5 will be further described in detail with reference to a specific example. Similarly to FIG. 8, it is assumed that four M cars are provided. In addition, assume that the torque necessary for the whole train for powering at certain time is 4000 Nm. In the case of normal condition, because the number of selected M cars is four, a torque command of 1000 Nm per one M car is output from the torque command computation block 10F1 when the torque is divided equally among the M cars. Similarly, in the case of 1M unselected, because the number of selected M cars is three, a torque command of 1333 Nm (4000÷3) per one M car is output from the torque command computation block 10F4 when the torque is divided equally among the M cars. On the other hand, in the case of 2M unselected, a torque command of 2000 Nm per one M car is output from the torque command computation block 10F3, and in the case of 3M unselected, a torque command of 4000 Nm per one M car is output from the torque command computation block 10F2. There is, however, each of the M cars has a limit on output torques, and when the limit torque is assumed to be 1500 Nm, for example, torque commands output from the torque command computation blocks are limited up to 1500 Nm. A selection unit selects torque commands with a large number of unselected cars from torque commands whose sum for all the M cars is equal to sum of torque commands under normal condition. Thus, in this example, 1M unselected with which a torque command of 1333 Nm per one M car can be output is selected.

According to the car control device of the second embodiment, a variable load command for each of the M cars is calculated on the basis of detected variable loads of the cars included in the train, and the torque commands are calculated in a plurality of patterns including both normal powering and motor car selection powering on the basis of the calculated variable load commands. The car control device enables switching of torque commands when the operation mode is switched from the normal mode to the M car selection mode and switching of torque commands when the operation mode is switched from the M car selection mode to the normal mode in a rapid and smooth manner. As a result, stability of control for preventing deterioration in riding comfort is achieved.

Third Embodiment

Figure 9:
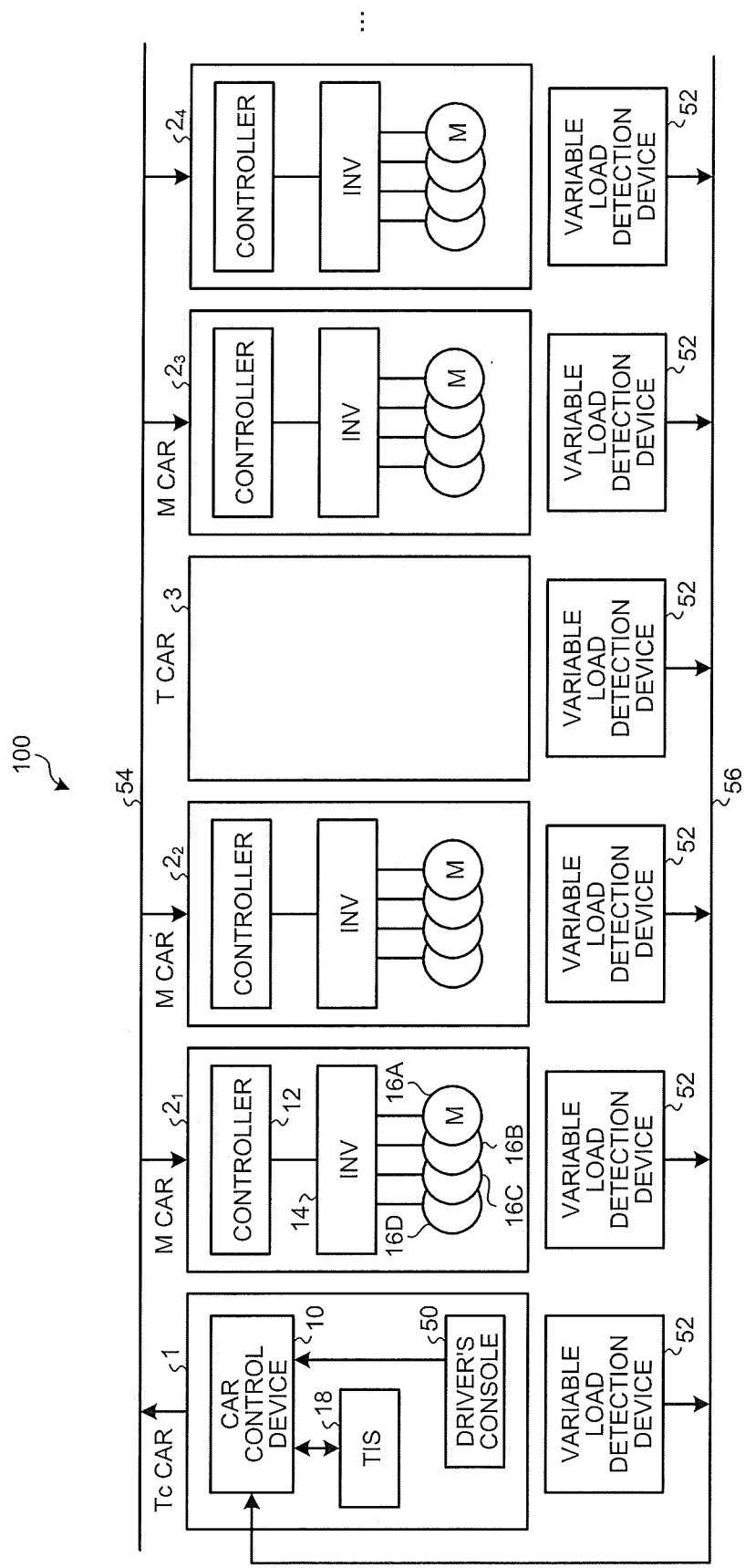
FIG. 9 is a system configuration diagram illustrating a configuration of a car control system according to a third embodiment.

FIG. 9 is a system configuration diagram illustrating a configuration of a car control system according to a third embodiment. A difference from the configuration of FIG. 1 according to the first embodiment lies in that a train information management device (TIS) 18 is provided in the Tc car 1. The train information management device 18 is a device for managing various information data (hereinafter referred to as "train information") transmitted in the train. In the third embodiment, the car control device 10 and the train information management device 18 constitute a car control system. The other configurations are the same as or equivalent to the configurations in the first embodiment illustrated in FIG. 1, the same or equivalent components will be designated by the same reference numerals, and redundant description thereof will be omitted.

Next, functions assigned to the car control device 10 and the train information management device 18 will be described. First, among the functional blocks in FIG. 2, the functions of the M car selection validity/invalidity determining unit 10A, the driving force calculating unit 10B, and the operating number calculating unit 10C can be assigned to the train information management device 18, and the functions of the driving force command calculating unit 10D can be assigned to the car control device 10.

In addition, among the functional blocks in FIG. 7, the functions of the M car selection validity/invalidity determining unit 10A, the driving force calculating unit 10B, the operating number calculating unit 10C, and the variable load command calculating unit 10E can be assigned to the train information management device 18 and the functions of the driving force command calculating unit 10D and the torque command calculating unit 10F can be assigned to the car control device 10.

The allocation of the functions as described above allows the scale of improvement of the car control device to be small, which produces an advantageous effect of making the impact on the car control device, which is mounted under the floor of the car, small.

Finally, a hardware configuration for implementing the functions of the car control device 10 and the train information management device 18 in the present embodiment will be described with reference to FIG. 10. For implementing the functions of the car control device 10 and the train information management device 18, a configuration may include a central processing unit (CPU) 200 for performing computation, a memory 202 for storing programs to be read by the CPU 200, and an interface 204 for inputting and outputting signals, as described in FIG. 10. Note that the CPU 200 may be a component called a computing device, a microprocessor, a microcomputer, a processor, a digital signal processor (DSP), or the like. In addition, the memory 202 is a volatile or nonvolatile semiconductor memory or the like such as a random access memory (RAM), a read only memory (ROM), a flash memory, an erasable programmable ROM (EPROM), or an electrically EPROM (EEPROM).

Specifically, the memory 202 stores therein programs for executing the functions of the car control device 10 and the train information management device 18. The CPU 200 sends and receives necessary information via the interface 204 to perform various computation processes described in the present embodiment.

Figure 10:
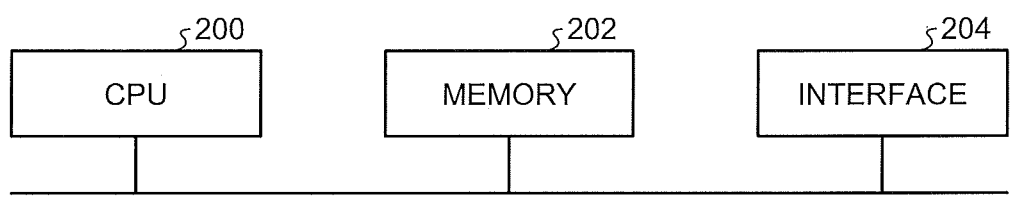
FIG. 10 is a block diagram illustrating an example of a hardware configuration for implementing the functions of a car control device and a train information management device in the first to third embodiments.
Figure 11:
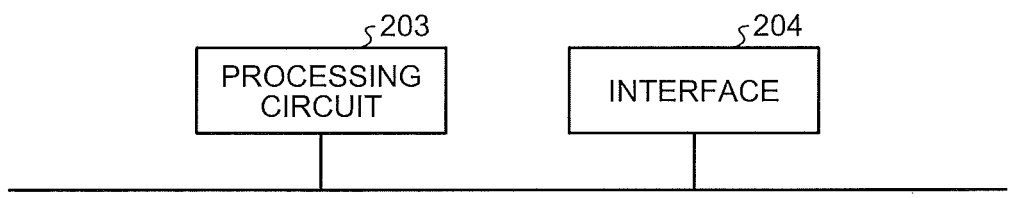
FIG. 11 is a block diagram illustrating another example of a hardware configuration for implementing the functions of the car control device and the train information management device in the first to third embodiments.

Note that the CPU 200 and the memory 202 illustrated in FIG. 10 may be replaced by a processing circuit 203 as in FIG. 11. The processing circuit 203 is a single circuit, a composite circuit, a programmed processor, a parallel-programmed processor, an application specific integrated circuit (ASIC), a field-programmable gate array (FPGA), or a combination thereof, for example.

Note that the configurations presented in the embodiment above are examples of the present invention, and can be combined with other known technologies or can be partly omitted or modified without departing from the scope of the present invention.

REFERENCE SIGNS LIST 1 control car (Tc car); 2 ($2_1$ to $2_4$) motor car (M car); 3 trailer car (T car); 10 car control device; 10A M car selection validity/invalidity determining unit; 10B driving force calculating unit; 10C operating number calculating unit; 10D driving force command calculating unit; 10E variable load command calculating unit; 10E1, 10E2 variable load command computation block; 10F torque command calculating unit; 10F1 to 10F4 torque command computation block; 10F5 torque command selection block; 12 controller; 14 inverter; 16 (16A to 16D) motor; 18 train information management device (TIS); 50 driver's console; 52 variable load detection device; 54, 56 transmission line; 100 train; 200 CPU; 202 memory; 203 processing circuit; 204 interface.

The invention claimed is:

1. A car control device for performing motor car selection control in a train including a plurality of motor cars to reduce the number of motor cars to be operated, the car control device comprising:
a processor to execute a program;
a memory to store the program which, when executed by the processor, performs processes of,
selecting one of a normal mode or a motor car selection mode, wherein, in the normal mode, each motor of the train is operated, and wherein, in the motor car selection mode, at least one motor of the train is operated and at least one other motor of the train is not operated, and wherein selection of the motor car selection mode is made based in part on (a) the train having a speed that is higher than a threshold and (b) a determination that a preset time period has elapsed since a determination that wheel slippage has occurred in at least one motor car of a set of motor cars, of the plurality of motor cars, currently driving the train:
after selecting the motor car selection mode, calculating driving force commands to be given to the motor cars that operate depending on the number of motor cars to be operated, wherein, in the calculating, the driving force commands are changed using jerk control such that the train is not jerked at switching of operation when the number of motor cars to be operated changes; and
after entering the motor car selection mode, determining that a driving wheel of the train is slipping and switching from the motor car selection mode to the normal mode where each motor of the train is operated.

2. The car control device according to claim 1, wherein when the number of motor cars to be operated changes, the processor changes the driving force commands in such a manner that a first period during which values change for driving force commands for operation of motor cars to be operated in the motor car selection mode, and a second period during which values change for driving force commands for operation of motor cars not to be operated in the motor car selection mode, are equal with each other, and the first period and the second period starts at a same time, and ends at another same time.

3. The car control device according to claim 1, wherein when the number of motor cars to be operated changes, the processor changes the driving force commands in such a manner that a sum of (a) a driving force caused by a driving force command for operation of motor cars to be operated in the motor car selection mode, and (b) a driving force caused by a driving force command for operation of motor cars not to be operated in the motor car selection mode, is kept at a constant value during a process in which both of the driving force commands change.

4. The car control device according to claim 1, wherein when the train is in a rain mode, the motor car selection control is canceled, wherein the processor is configured to determine that the train is in the rain mode based on a wiper operation signal of the train.

5. The car control device according to claim 1, the processor further performs:
  calculating a variable load command for each of the motor cars on the basis of detected variable loads of cars constituting the train; and
  calculating torque commands in a plurality of patterns including both of the normal mode and the motor car selection mode on the basis of the variable load commands.

6. A car control system comprising: a train information management device comprising a first processor for managing train information; and a car control device comprising a second processor for the performing motor car selection control in a train including a plurality of motor cars to reduce the number of motor cars to be operated; and, wherein
  the train information management device includes:
    the first processor to execute a first program;
    a first memory to store the first program which, when executed by the first processor, performs processes of,
    selecting one of a normal mode or a motor car selection mode, wherein, in the normal mode, each motor of the train is operated, and wherein, in the motor car selection mode, at least one motor of the train is operated and at least one other motor of the train is not operated, and wherein selection of the motor car selection mode is based in part on (a) the train having a speed that is higher than a threshold and (b) a determination that a preset time period has elapsed since a determination that wheel slippage has occurred in at least one motor car of a set of motor cars, of the plurality of motor cars, currently driving the train:
    after selecting the motor car selection mode, calculating driving force necessary for the train to travel;
    determining the number of motor cars to be operated on the basis of the driving force; and
    after entering the motor car selection mode, determining that a driving wheel of the train is slipping and switching from the motor car selection mode to the normal mode where each motor of the train is operated,
  the car control device includes:
    the second processor to execute a second program;
    a second memory to store the second program which, when executed by the second processor, performs processes of,
    calculating driving force commands to be given to the motor cars that operate depending on the number of motor cars to be operated, and
    in the calculating, the driving force commands are changed using jerk control such that the train is not jerked at switching of operation when the number of motor cars to be operated changes.

7. The car control device according to claim 1,
  wherein the processor further calculates driving force necessary for the train to travel.

8. The car control device according to claim 7,
  wherein the processor further determines the number of motor cars to be operated on the basis of the driving force.

9. The car control device according to claim 1, wherein the processor generates a plurality of torque patterns which correspond to the normal mode and the motor car selection mode, each of the patterns defines a torque command for each of the plurality of the motor cars to be operated so that a sum of the torque commands becomes equal to a sum of the torque commands in the normal mode, and the processor outputs one of the plurality of the torque patterns to the plurality of the motor cars when switching between the normal mode and the motor car selection mode occurs.

10. The car control system according to claim 6, wherein the second processor generates a plurality of torque patterns which correspond to the normal mode and the motor car selection mode, each of the patterns defines a torque command for each of the plurality of the motor cars to be operated so that a sum of the torque commands becomes equal to a sum of the torque commands in the normal mode, and the processor outputs one of the plurality of the torque patterns to the plurality of the motor cars when switching between the normal mode and the motor car selection mode occurs.

* * * * *